United States Patent
Furuki

(10) Patent No.: US 7,345,389 B2
(45) Date of Patent: Mar. 18, 2008

(54) MOTOR, MOTOR HAVING ENCODER, AND MULTI-DIRECTION INPUT DEVICE

(75) Inventor: Shigeru Furuki, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 318 days.

(21) Appl. No.: 11/133,087

(22) Filed: May 19, 2005

(65) Prior Publication Data

US 2005/0258691 A1 Nov. 24, 2005

(30) Foreign Application Priority Data

May 24, 2004 (JP) ............... 2004-153454

(51) Int. Cl.
*H02K 13/00* (2006.01)
(52) U.S. Cl. .................. 310/68 C; 310/239; 310/68 B; 310/71; 310/112; 310/89
(58) Field of Classification Search .................. 310/89, 310/71, 239, 68 B, 68 C, 68 R, 83, 112
See application file for complete search history.

(56) References Cited

U.S. PATENT DOCUMENTS

| | | | | |
|---|---|---|---|---|
| 5,006,742 | A * | 4/1991 | Strobl et al. ................. | 310/88 |
| 5,294,851 | A * | 3/1994 | Tajima et al. ............. | 310/68 C |
| 5,294,852 | A * | 3/1994 | Straker ..................... | 310/68 C |
| 5,382,852 | A * | 1/1995 | Yuhi et al. ............. | 310/40 MM |
| 5,434,460 | A * | 7/1995 | Mabuchi et al. .............. | 310/71 |
| 5,600,193 | A * | 2/1997 | Matsushima et al. ..... | 310/68 C |
| 5,633,542 | A * | 5/1997 | Yuhi et al. ............ | 310/40 MM |
| 6,300,696 | B1 * | 10/2001 | Wong ........................ | 310/68 R |
| 6,737,771 | B2 * | 5/2004 | Fujita et al. .............. | 310/68 B |
| 6,803,687 | B2 * | 10/2004 | Murakami et al. ........... | 310/71 |
| 6,858,955 | B2 * | 2/2005 | Lau .............................. | 310/51 |
| 2003/0016476 | A1 | 1/2003 | Yamamoto et al. .......... | 361/25 |
| 2005/0258691 | A1 * | 11/2005 | Furuki ........................ | 310/89 |

FOREIGN PATENT DOCUMENTS

| | | |
|---|---|---|
| JP | 6-44295 | 11/1994 |
| JP | 7-44602 | 11/1995 |
| JP | 2996910 | 10/1999 |
| JP | 2002-108471 | 4/2002 |

* cited by examiner

*Primary Examiner*—Karl Tamai
(74) *Attorney, Agent, or Firm*—Brinks Hofer Gilson & Lione

(57) ABSTRACT

A motor includes a casing and a holder which support a rotation shaft. A concave groove is formed in the holder near the inner periphery of the holder. The concave groove accommodates a positive temperature coefficient thermistor functioning as an overcurrent protection device. A tapered cutout surface is formed on the outer wall of the holder so that the cutout surface is inclined at 45 degrees with respect to a line passing through the rotation shaft and the groove portion of the holder has a maximum length of the holder in its axis direction. A multi-direction input device includes these two motors functioning as driving sources to provide a force feedback to an operation lever. The first and second motors are disposed such that lines passing through their rotation shafts are orthogonal to each other and cutout surfaces are opposed to each other with an intersection of the lines therebetween.

7 Claims, 9 Drawing Sheets

MOTOR, MOTOR HAVING ENCODER, AND MULTI-DIRECTION INPUT DEVICE

This application claims the benefit of priority to Japanese Patent Application No. 2004-152642, filed on May 24, 2004, herein incorporated by reference.

BACKGROUND OF THE INVENTION

1. Field of the Invention

The present invention relates to a motor used for, for example, in-car electrical equipment and game consoles and, in particular, to a motor incorporating a positive temperature coefficient thermistor to control an overcurrent by sensing the temperature of the motor, to a motor with encoder using such a motor, and to a multi-direction input device using such a motor.

2. Description of the Related Art

A motor is widely used in various fields, such as in-car electrical equipment and game consoles. For example, a motor can be used for a motor with encoder in which the rotation of a code plate coupled to a rotation shaft of the motor is sensed by a photo interrupter (refer to, for example, Japanese Examined Utility Model Registration Application Publication No. 6-44295, in particular, pages 1 to 2 and FIG. 2). Also, a motor can be used for a multi-direction input device in which two orthogonally disposed motors function as driving sources when pivotally operating an operation lever (refer to, for example, Japanese Unexamined Patent Application Publication No. 2002-108471, in particular, pages 5 to 7 and FIG. 4).

Among such motors used in various fields, a compact motor is known in which an opening of a cylindrical casing closed at one end is covered by a holder having the same shape and the holder holds a positive temperature coefficient thermistor (refer to, for example, Japanese Unexamined Utility Model Registration Application Publication No. 7-44602, in particular, pages 4 to 5 and FIG. 1). The positive temperature coefficient thermistor (hereinafter simply referred to as a "PTC") is a plate-shaped device composed of two laminated electrodes with a resistance material therebetween. The internal electrical resistance of a PTC rapidly increases when a certain temperature is exceeded. Accordingly, in a motor incorporating a PTC, when the motor is continuously overloaded or the rotation is forced to stop, an overcurrent flows in the motor, and therefore, the temperature inside the motor rises and the temperature of the PTC also rises. This rapidly increases the internal resistance value. Thus, an electrical current supplied to the motor rapidly decreases. As a result, the motor can be protected against overheating.

On the other hand, in the above-described known motors, a cylindrical casing closed at one end surrounds a commutator attached to a rotation shaft. The opening of the casing is covered by a holder having the same shape and the holder holds a PTC. Accordingly, a shell of the motor is composed of a cylinder in which the casing and the holder are integrated. This structure prevents the size of a product incorporating the motor from being reduced. For example, when this motor is applied to a motor with encoder and a code plate coupled to the rotation shaft is not sufficiently distant from an end of the holder, a photo interrupter hits against the holder. Accordingly, the total length of the motor with encoder inevitably increases in its axis direction. Also, when this motor is applied to the above-described multi-direction input device and two orthogonally arranged motors are not sufficiently distant from each other at the intersection thereof, holders integrated with the bottom ends of the motors hit against each other. This also increases the size of the multi-direction input device.

SUMMARY OF THE INVENTION

Accordingly, it is a first object of the present invention to provide a motor that allows a product including the motor to be easily miniaturized. It is a second object of the present invention to provide a motor with an encoder suitable for making the product more compact. It is a third object of the present invention to provide a multi-direction input device suitable for making the product more compact.

According to a first aspect of the present invention, a motor includes a cylindrical casing having an opening at one end. A permanent magnet is fixed to the inner peripheral surface of the casing. The motor further includes a holder for covering the opening of the casing, a rotation shaft rotatably supported by the casing and the holder, an armature and a commutator coupled to the rotation shaft, a brush in sliding contact with the commutator, an input terminal connected to the brush, and a plate-shaped positive temperature coefficient thermistor for controlling an electrical current flowing in a winding of the armature. In the motor, the holder accommodates the input terminal and the positive temperature coefficient thermistor and the positive temperature coefficient thermistor is accommodated in a container section formed in the holder in the vicinity of the periphery of the inner wall of the holder opposed to the inside of the casing. A cut out figure portion is formed on the outer wall of the holder and the cut out figure portion obliquely extends so that the container section side of the holder has the maximum length of the holder and an axis line on the rotation shaft passes through the cut out figure portion.

In the motor having such a structure, a plate-like PTC that determines the length of the holder in the axis direction is accommodated in a container section formed in the holder in the vicinity of the periphery of the inner wall of the holder. Also, the cut out figure portion is formed on the outer wall of the holder and the cut out figure portion obliquely extends so that the container section side of the holder has the maximum length of the holder. Accordingly, when this motor is assembled in various products, the cut out figure portion formed on the outer wall of the holder can be utilized as a space for other parts. As a result, the size of the product can be reduced.

Preferably, the PTC is accommodated in the container section such that a plane of the PTC is parallel to the rotation shaft. This structure efficiently decreases the maximum length of the holder in its axis direction.

In this structure, the cut out figure portion may be formed as steps or a curve. Preferably, the cut out figure portion is a tapered surface inclined at substantially 45 degrees with respect to the rotation shaft. This structure can efficiently utilize the space of the cut out figure portion at a maximum.

According to a second aspect of the present invention, a motor with encoder includes a motor having the above-described structure, a code plate, and a sensing device for sensing the rotation of the code plate. In the motor with encoder, the code plate is coupled to an end of the rotation shaft protruding from the holder and at least part of the sensing device is disposed in the cut out figure portion.

In a motor with encoder having the above-described structure, a cut out figure portion formed on the outer wall of the holder can be efficiently utilized as a space where a photo interrupter or an MR device is disposed. Accordingly, the total length of the motor with encoder including the code plate can be reduced in its axis direction.

According to a third aspect of the present invention, a multi-direction input device includes an operation lever pivotally operable and two driving levers rotatable in accordance with the pivotal operation of the operation lever. Rotation shafts of the two driving levers are orthogonal to each other. The multi-direction input device further includes a mounting base for rotatably supporting the driving levers and two actuators for driving the driving levers. In the multi-direction input device, the two actuators are the motors having the above-described structure, the two motors are orthogonally arranged so that the holders are disposed close to each other, and the cut out figure portions formed on the holders are opposed to each other at an intersecting point of the two motors.

In a multi-direction input device having such a structure, cut out figure portions on holders of two orthogonally disposed motors are opposed to each other at an intersecting point of the motors. Thus, each cut out figure portion can be efficiently utilized as a space for the other holder. The holders of the two motors can be arranged as closely as possible at the intersecting point of the motors. Accordingly, the size of the multi-direction input device can be reduced in plan view.

Preferably, in the above-described structure, a gear is coupled to the rotation shaft of each of the motors, the rotation shaft protrudes from a side opposite to the holder, and the gears are engaged with gear sections mounted on the driving levers, respectively. Preferably, the multi-direction input device further includes two rotary encoders, each of which senses the rotation of each driving lever via a gear train, and a control unit for controlling driving of the two motors based on signals output from the rotary encoders. In the multi-direction input device, the mounting base includes a supporting module having substantially orthogonally connected side walls, and each wall of the supporting module supports the gear train and a code plate of the rotary encoder.

In a motor according to the present invention, a plate-shaped PTC is held in a container section formed in a holder near the inner peripheral surface. An obliquely extending cut out figure portion is formed on the outer wall of the holder so that the holder has a maximum length at the container section side. Accordingly, when the motor is assembled in various products, the size of the product can be reduced by utilizing the cut out figure portion formed on the outer wall of the holder as a space for other parts.

In a motor with encoder according to the present invention, a code plate is coupled to an end of a rotation shaft protruding from a holder of the above-described motor. At least part of a sensing device for sensing the rotation of the code plate is disposed at the cut out figure portion. Accordingly, a cut out figure portion formed on the outer wall of the holder can be efficiently utilized as a space where a photo interrupter or an MR device is disposed. As a result, the total length of the motor with encoder including the code plate can be reduced in its axis direction.

In a multi-direction input device according to the present invention, these two motors are used as driving sources for a pair of driving levers rotating in accordance with the pivotal operation of an operation lever. The two motors are orthogonally disposed such that the cutout potions are opposed to each other at the intersection of the motors. Thus, each cut out figure portion can be efficiently utilized as a space for the other holder. The holders of the two motors can be arranged as closely as possible at the intersection of the motors. Accordingly, the size of the multi-direction input device can be reduced in plan view.

DESCRIPTION OF THE PREFERRED EMBODIMENTS

Figure 1:
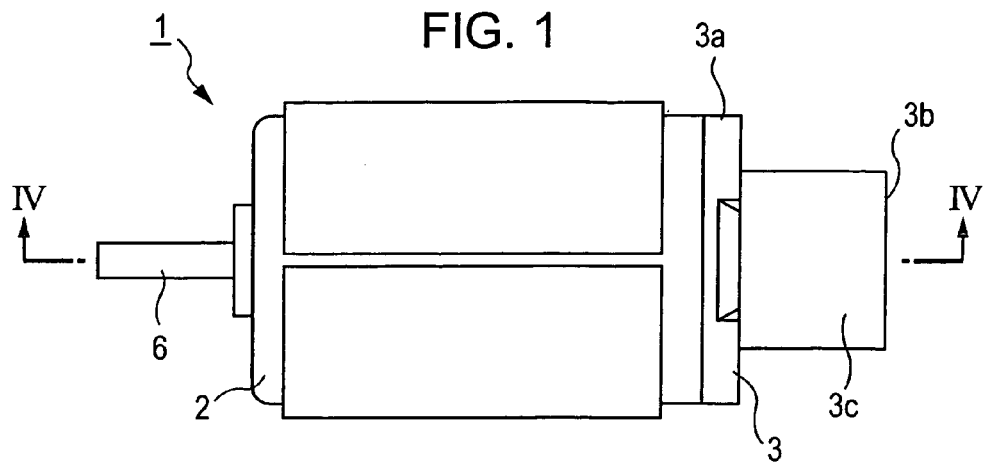
FIG. 1 is a plan view of a motor according to an embodiment of the present invention.
Figure 2:
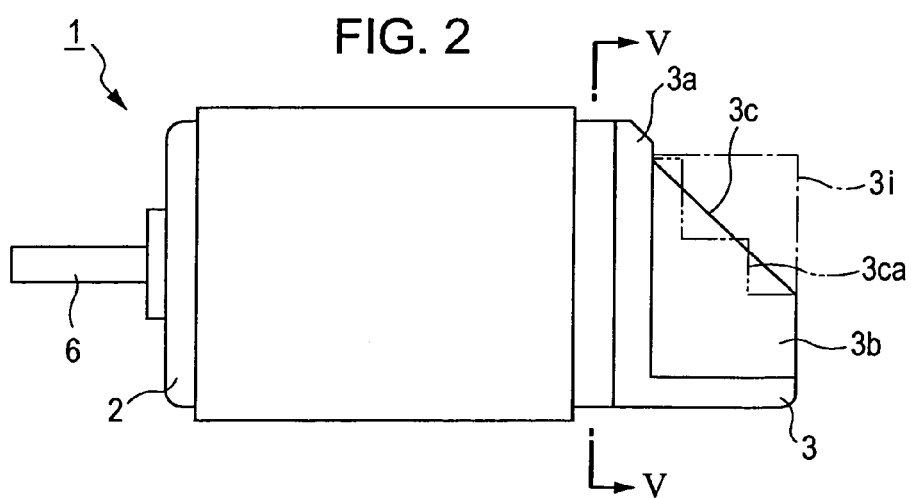
FIG. 2 is a front view of the motor.
Figure 3:
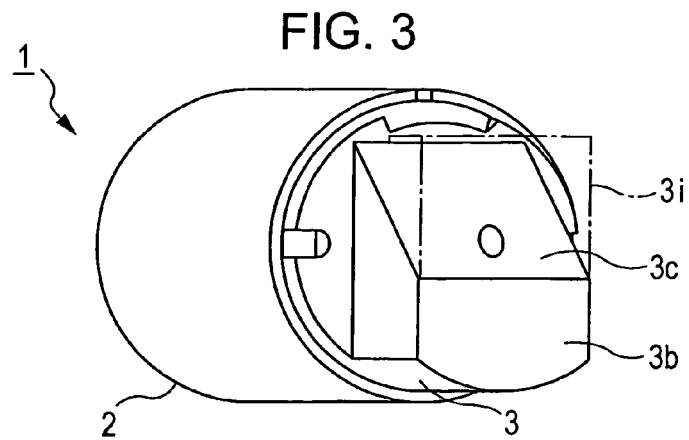
FIG. 3 is a perspective view of the motor.
Figure 4:
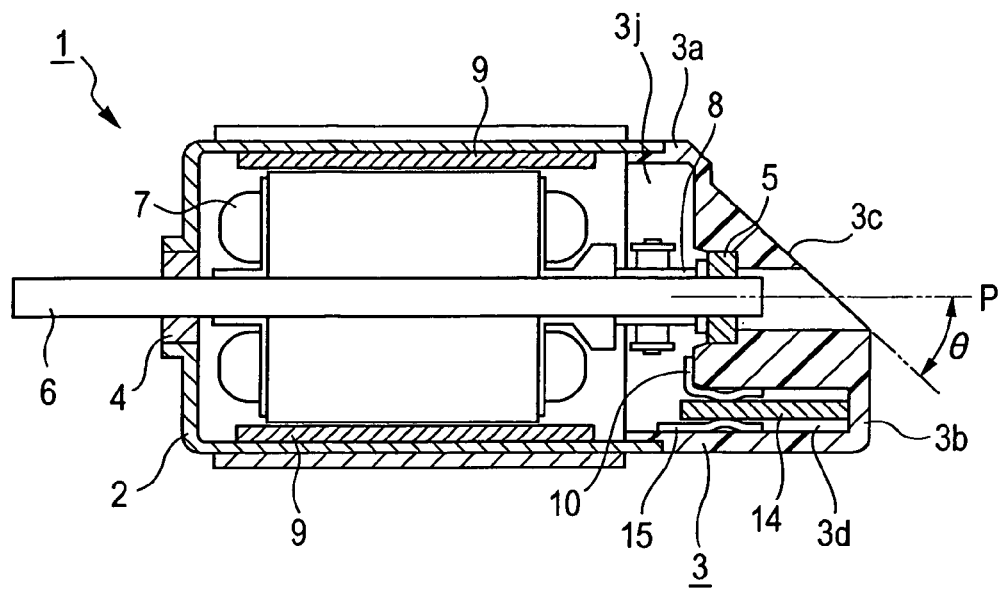
FIG. 4 is a sectional view of the motor taken along a line IV-IV in FIG. 1.
Figure 5:
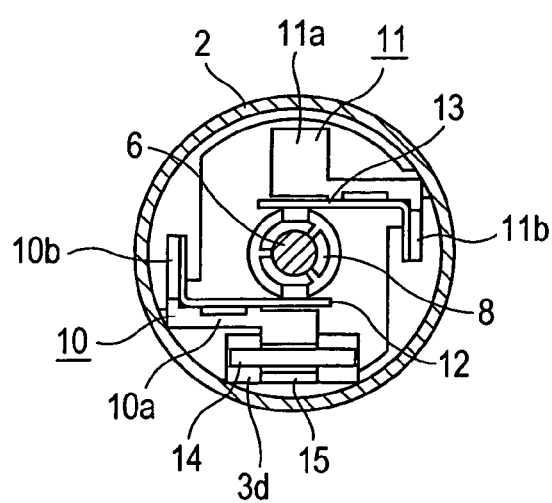
FIG. 5 is a sectional view of the motor taken along a line V-V in FIG. 2.
Figure 6:
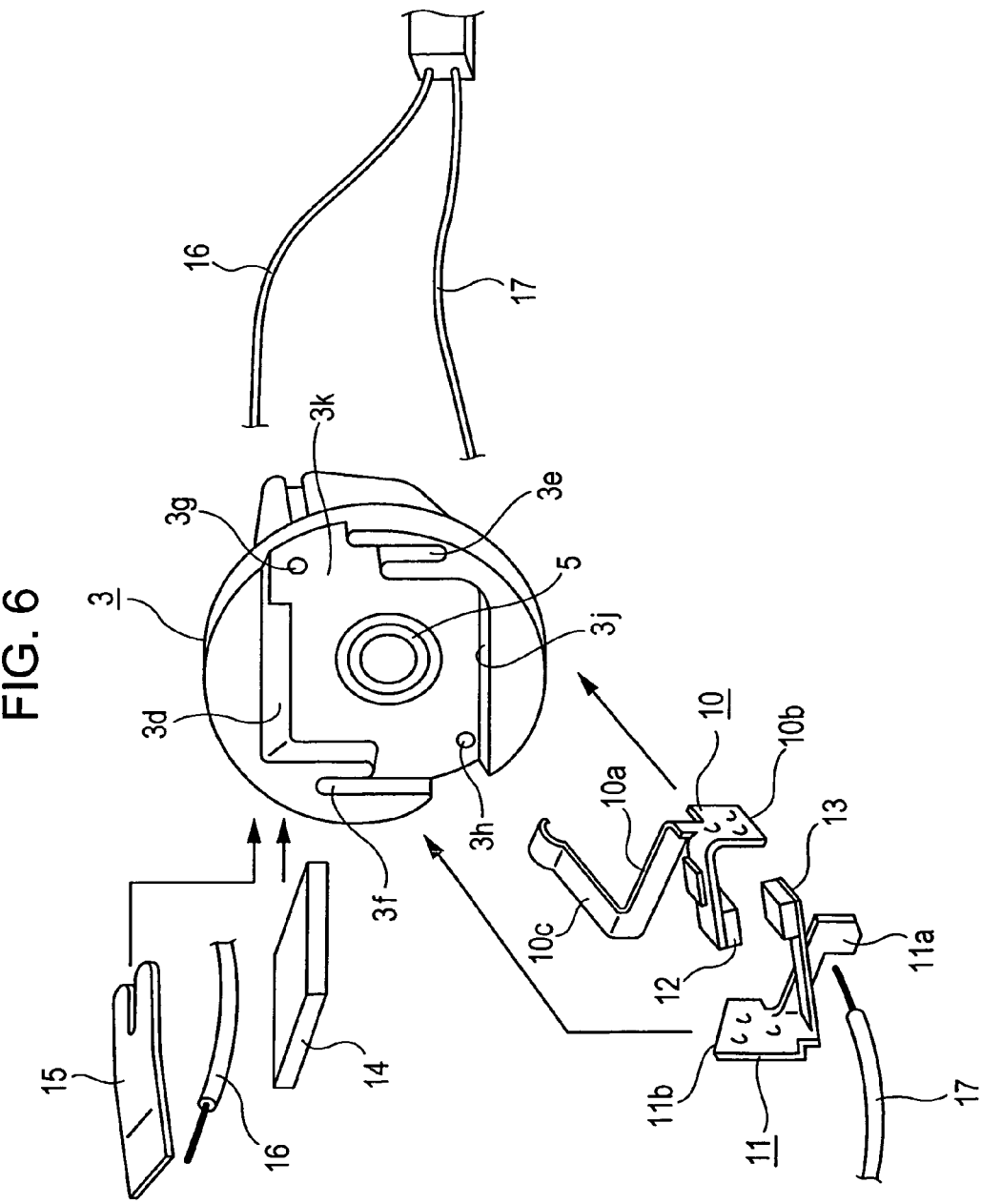
FIG. 6 is an exploded perspective view of the main parts of the motor.

Embodiments of the present invention will be described below with reference to the accompanying drawings. FIG. 1 is a plan view of a motor according to an embodiment of the present invention. FIG. 2 is a front view of the motor. FIG. 3 is a perspective view of the motor. FIG. 4 is a sectional view of the motor taken along a line IV-IV in FIG. 1. FIG. 5 is a sectional view of the motor taken along a line V-V in FIG. 2. FIG. 6 is an exploded perspective view of the main parts of the motor.

As shown in these drawings, a motor 1 according to this embodiment includes a cylindrical casing 2 closed at one end and a holder 3 for covering the opening of the casing 2. The casing 2 is made from a metal, such as soft iron. The holder 3 is made from a synthetic resin. The holder 3 is fixed to the opening of the casing 2 by methods such as caulking. Bearings 4 and 5 are secured to the center portions of the casing 2 and the holder 3, respectively. These bearings 4 and 5 rotatably support a rotation shaft 6. An armature (coil) 7 and a commutator 8 are attached to the rotation shaft 6. A permanent magnet 9 is secured to the inner peripheral surface of the casing 2 so that the permanent magnet 9 surrounds the armature 7.

The holder 3 includes a circular disk-shaped base portion 3a which is pressed into the opening of the casing 2 and a protrusion 3b extending from the bottom of the base portion 3a in the direction opposite to the casing 2. A cutout surface 3c is formed on the outer surface of the protrusion 3b, thus forming a cut out figure portion 3i. The cutout surface 3c is a tapered surface obliquely extending from the periphery of the base portion 3a to the end of the protrusion 3b. As can be seen in FIG. 4, an angle $\theta$ between a line P passing through the rotation shaft 6 and the tapered cutout surface 3c is set to be 45 degrees. A recess 3j is formed on the inner side of the disk-shaped base portion 3a to accommodate brushes 12 and 13. A pair of holding grooves 3e and 3f are formed while continuously extending from the recess 3j. A bottom surface 3k of the recess 3j holds the bearing 5. A pair of through-holes 3g and 3h is formed on the bottom surface 3k. Also, a concave groove 3d is formed on the bottom surface 3k while extending towards the end of the protrusion 3b parallel to the line P. The concave groove 3d is formed near the periphery of the inner surface of the holder 3 opposed to the inside of the casing 2. The length of the holder 3 in its axis direction becomes maximum at the position where the concave groove 3d is formed.

A pair of input terminals 10 and 11 is arranged in the recess 3j of the holder 3. The input terminal 10 includes a base portion 10a disposed on the inner bottom surface 3k, a holding portion 10b which is formed at one end of the base portion 10a while being bent at 90 degrees to be inserted into the holding groove 3e, and a contact blade 10c which is formed at the other end of the base portion 10a while being bent at 90 degrees to extend into the concave groove 3d. The input terminal 10 is fixed to the holding groove 3e formed in the holder 3. A fixed end of the brush 12 is connected to the holding portion 10b of the input terminal 10. A free end of the brush 12 is in sliding contact with the commutator 8. Additionally, an elastic terminal 15 passes through the concave groove 3d of the holder 3. One end of a lead line 16 passing through the through-hole 3g is connected to a portion of the terminal 15 that is exposed to the recess 3j by means such as soldering. The input terminal 11 includes a base portion 11a disposed on the inner bottom surface 3k and a holding portion 11b which is formed at one end of the base portion 11a while being bent at 90 degrees to be inserted into the holding groove 3f. The input terminal 11 is fixed to the holding groove 3f formed in the holder 3. One end of a lead line 17 passing through the through-hole 3h is connected to the base portion 11a of the input terminal 11. Also, a fixed end of the brush 13 is connected to the holding portion 11b of the input terminal 11. A free end of the brush 13 is in sliding contact with the commutator 8.

In addition, the concave groove 3d of the holder 3 accommodates a PTC 14 serving as an overcurrent protection device. The PTC 14 is supported by the holder 3 such that a surface of the PTC 14 is parallel to the line P. A contact surface of the PTC 14, which functions as one connection end, is connected to the contact blade 10c of the input terminal 10 while being in elastic contact with each other in the concave groove 3d. A contact surface of the PTC 14, which functions as the other connection end, is connected to the terminal 15 disposed in the concave groove 3d while being in elastic contact with each other. The other ends of the lead lines 16 and 17 are connected to a feed line of the motor. Since the PTC 14 is connected in series to the feed line of the motor, the internal resistance value of the PTC 14 increases as the temperature of the motor rises, thus decreasing a current supplied to the motor.

In the motor 1 having such a structure, the concave groove 3d (container portion) extending in parallel to the line P passing through the rotation shaft 6 is formed near the periphery of inner wall, which faces the inside of the motor 1, of the holder 3 covering the open end of the casing 2. The concave groove 3d accommodates the PTC 14 functioning as an overcurrent protection device. In addition, the cut out figure portion 3i is formed on the outer surface of the holder 3 such that the cut out figure portion 3i has the tapered cutout surface 3c extending beyond the line P and inclined at 45 degrees with respect to the line P. Consequently, when the motor 1 is assembled in products, such as a motor with encoder and a multi-direction input device, which are described below, the cutout surface 3c formed on the outer surface of the holder 3 can be utilized as a space for other parts. As a result, the sizes of the products can be reduced.

In this embodiment, the cutout surface 3c is tapered to form the cut out figure portion 3i. However, as shown by a double-dashed chain line 3ca in FIG. 2, a stepped cutout surface may be disposed to form the cut out figure portion 3i.

Figure 7:
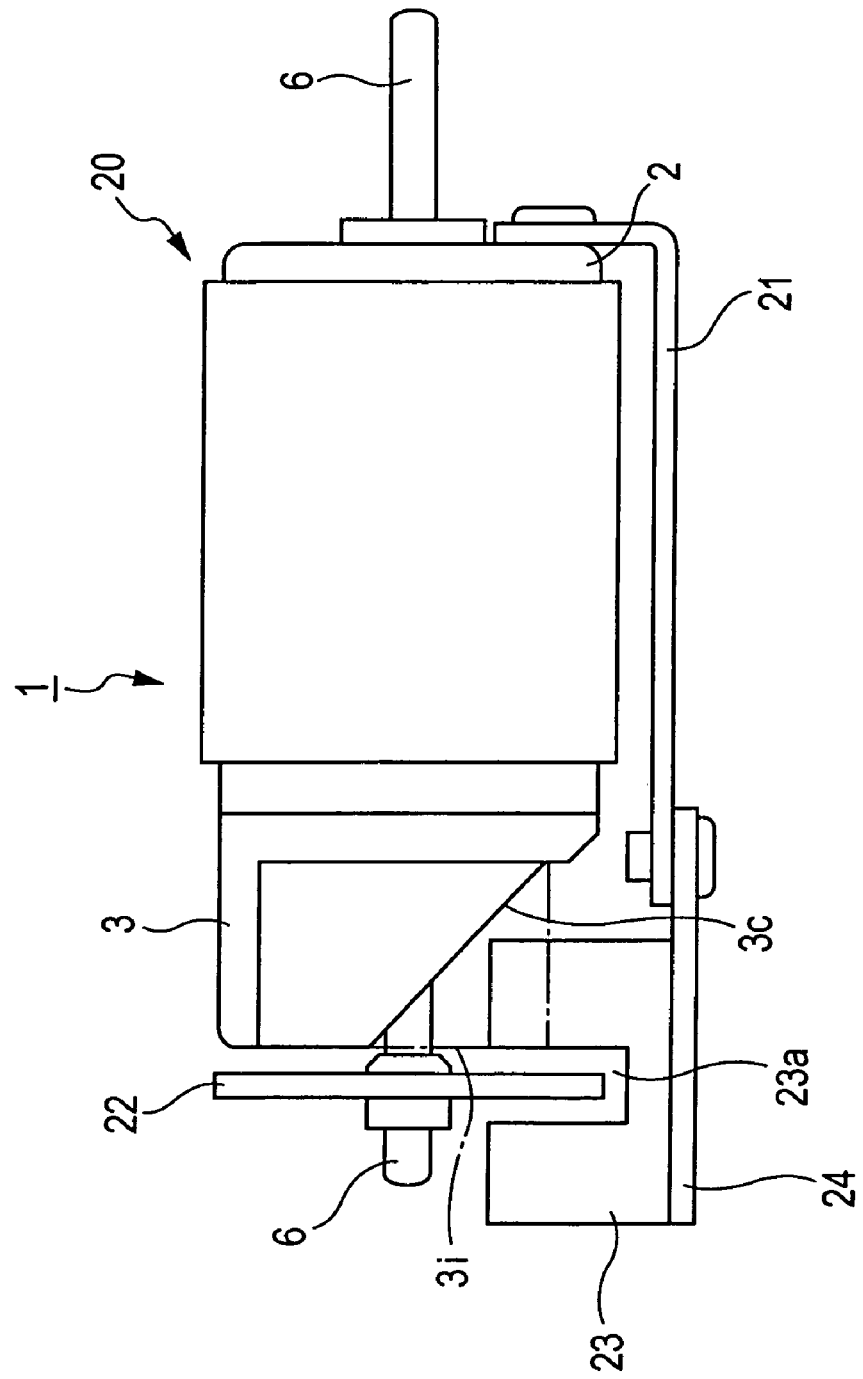
FIG. 7 is a front view of a motor with encoder according to an embodiment of the present invention.

FIG. 7 is a front view of a motor with encoder according to an embodiment of the present invention. A motor with encoder 20 includes the motor 1 mounted on a support plate 21, a code plate 22 coupled to the rotation shaft 6 of the motor 1, and a photo interrupter 23 for detecting the rotation of the code plate 22. The photo interrupter 23 is mounted on a printed wiring board 24 connected to the support plate 21.

The motor 1 used for the motor with encoder 20 has the identical structure to that shown in FIGS. 1 to 6 except that both ends of the rotation shaft 6 protrude from the casing 2 and the holder 3. As described above, the holder 3 accommodates the PTC and the tapered cutout surface 3c is formed on the outer surface of the holder 3. Although not shown, a worm gear is coupled to an end of the rotation shaft 6 protruding from the casing 2. When the motor 1 rotates, the torque of the motor 1 is transferred from the worm gear to appropriate components via a gear reduction mechanism, such as a worm wheel. On the other hand, the code plate 22 is coupled to an end of the rotation shaft 6 protruding from the holder 3. The code plate 22 includes a plurality of slits arranged at circumferentially spaced locations (not shown). The code plate 22 rotates inside a recess 23a formed on the photo interrupter 23 serving as a sensing element. A part of the photo interrupter 23 is disposed in a space surrounded by the cutout surface 3c of the holder 3 and the code plate 22. The photo interrupter 23 includes a light emitting device (not shown) and a light receiving device (not shown) opposed to the light emitting device with the recess 23a therebetween. When the code plate 22 rotates in synchronization with the rotation of the motor 1, light between the light emitting device and the light receiving device of the photo interrupter 23 is repeatedly blocked. Therefore, the rotation of the motor 1 is sensed as an electrical signal by the photo interrupter 23. Thus, the revolution speed of the motor 1 can be controlled based on the sensing signal.

In the motor with encoder 20 having such a structure, the holder 3 attached to the motor 1 accommodates the PTC 14 functioning as an overcurrent protection device. The tapered cutout surface 3c is formed on the outer surface of the holder 3. A part of the photo interrupter 23 is disposed in a space formed between the cutout surface 3c of the holder 3 and the code plate 22. Since at least part of the photo interrupter 23 is disposed in the cut out figure portion 3i, the total length of the motor with encoder 20 including the code plate 22 in its axis direction can be decreased. Alternatively, a code plate having a magnetic pattern in place of slits may be used for a magnetoresistive (MR) device to sense the rotation of the code plate 22. In this case, the MR device can also be disposed in a space formed between the cutout surface 3c of the holder 3 and the code plate 22.

Figure 8:
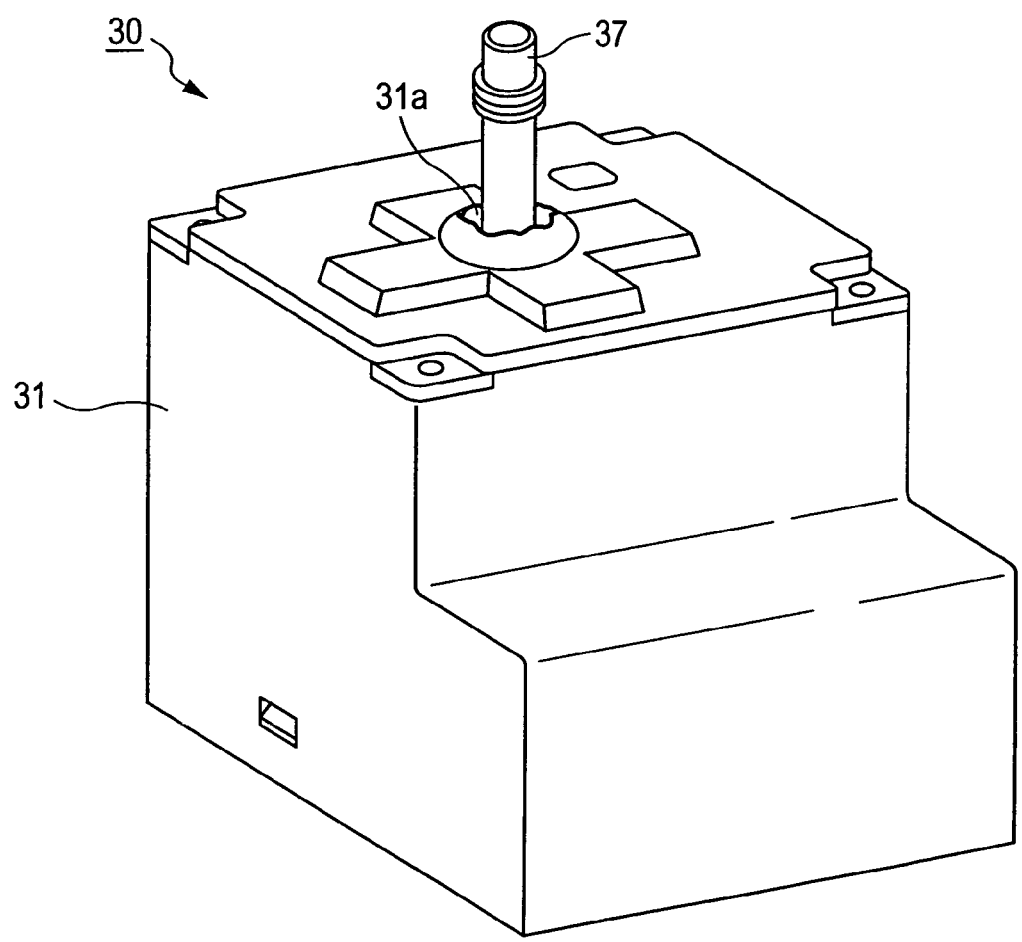
FIG. 8 is a perspective view of a multi-direction input device according to an embodiment of the present invention.
Figure 9:
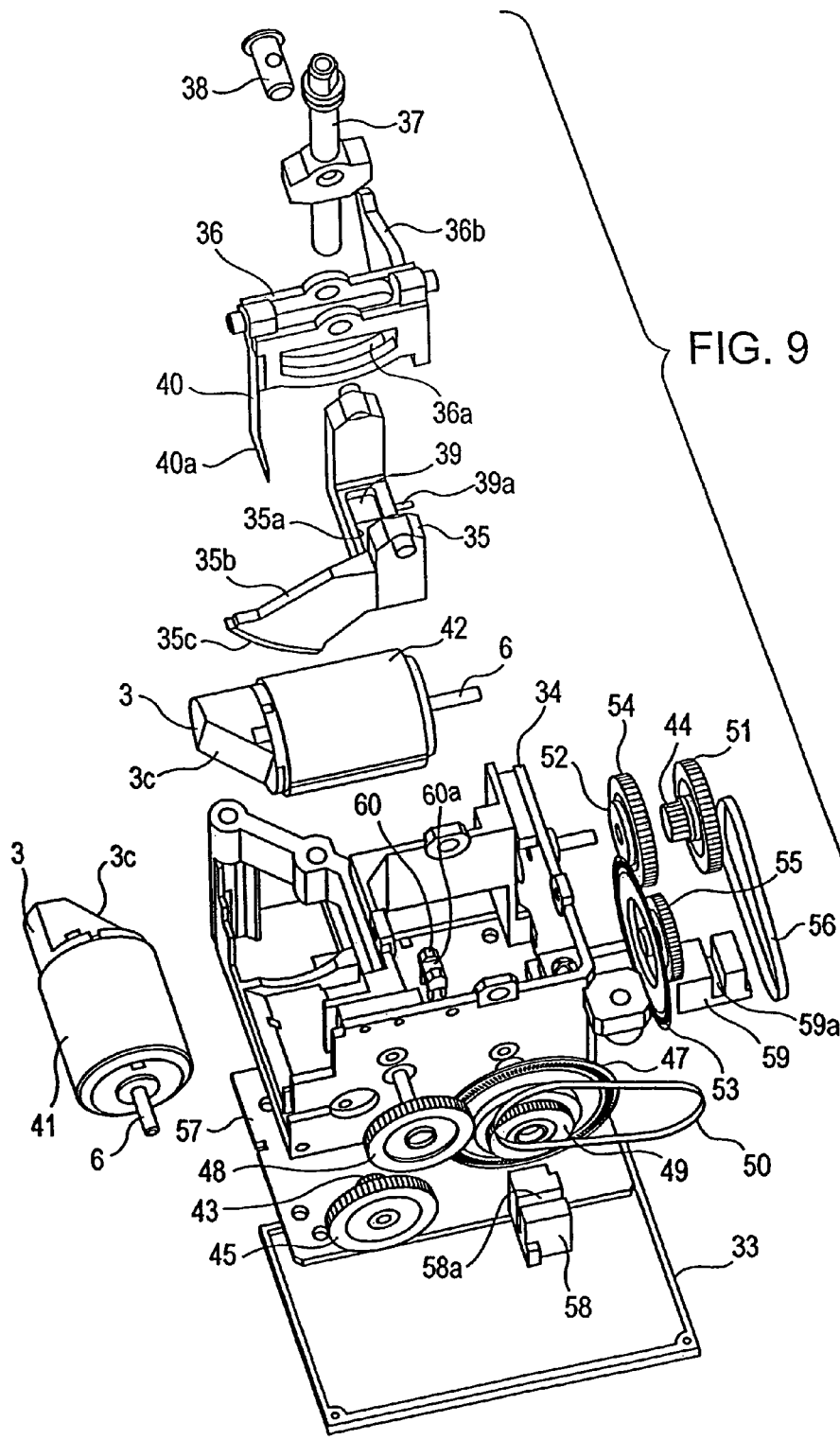
FIG. 9 is an exploded perspective view of a stick controller included in the multi-direction input device.
Figure 10:
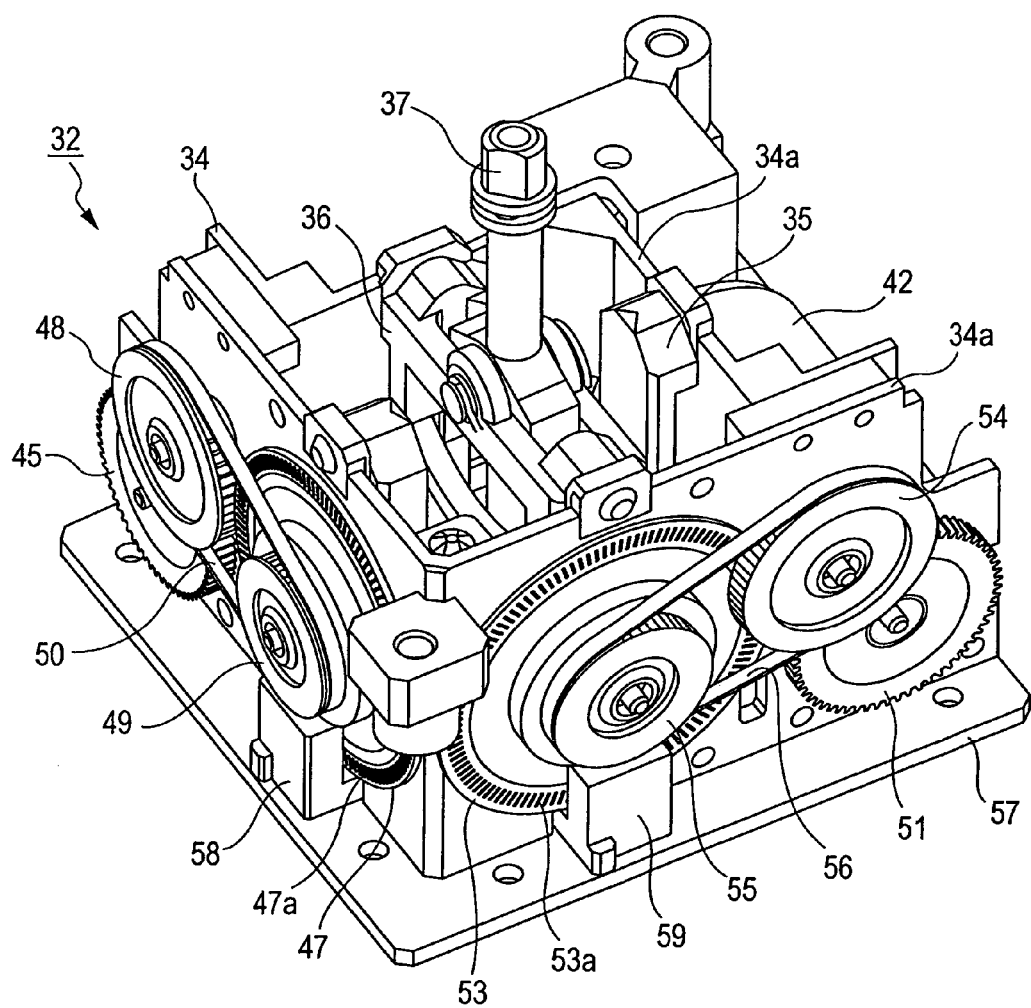
FIG. 10 is a perspective view of the stick controller.
Figure 11:
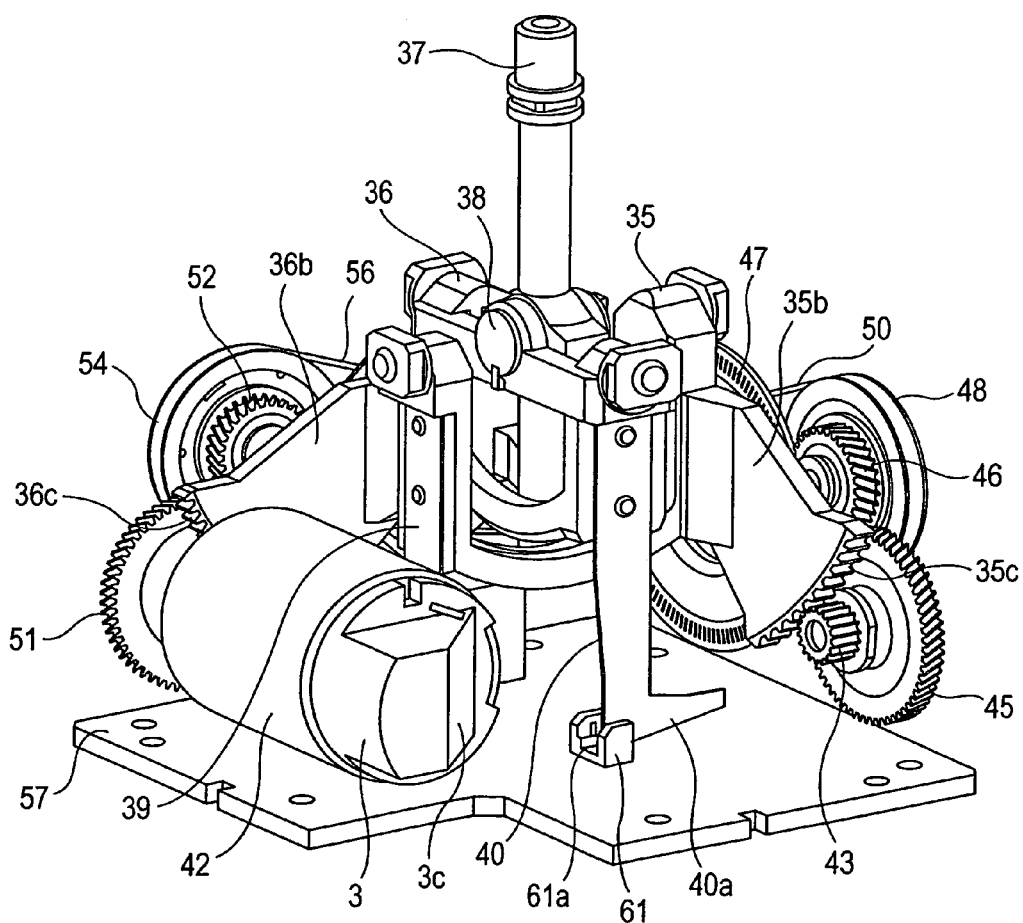
FIG. 11 is a perspective view of a power conversion mechanism included in the stick controller.
Figure 12:
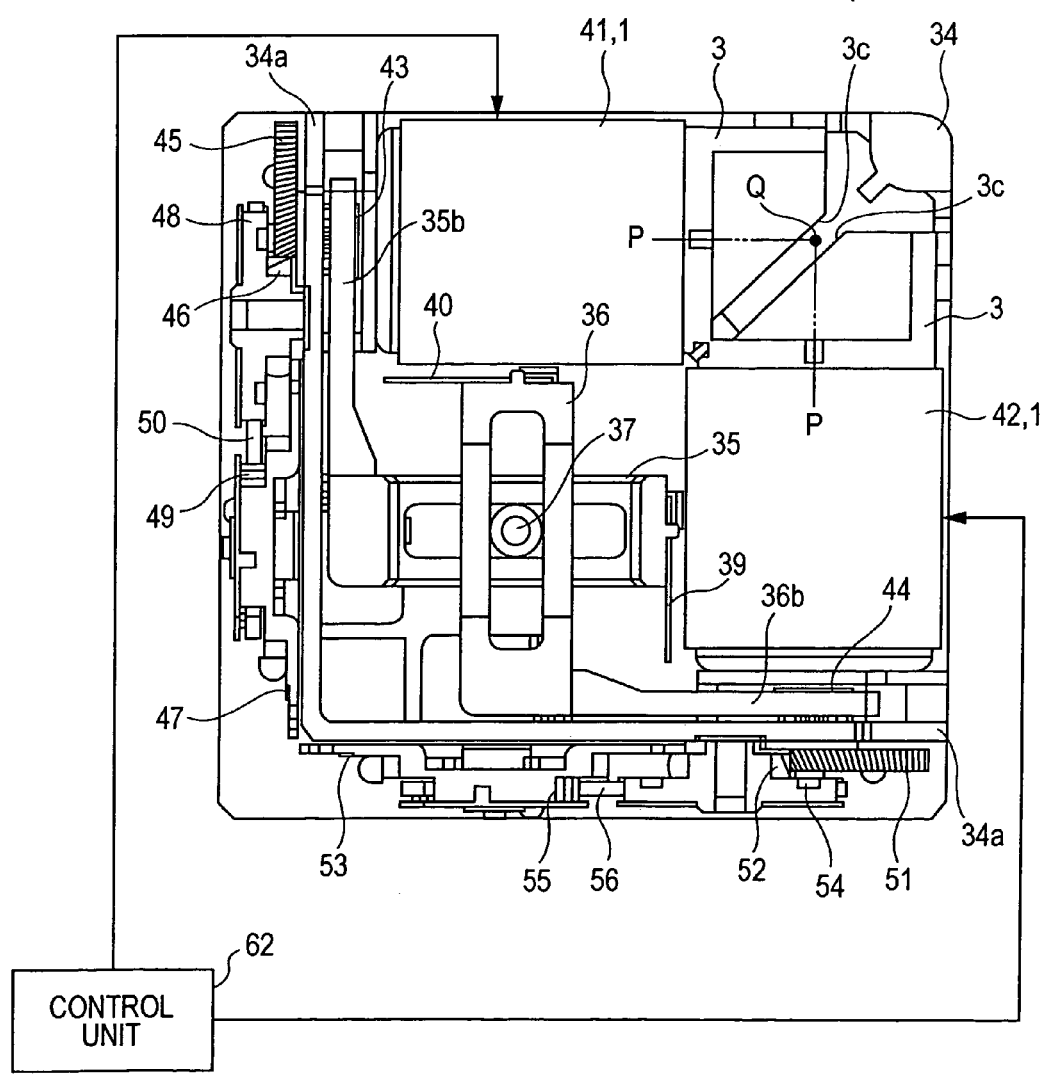
FIG. 12 is a plan view illustrating the layout of parts of the multi-direction input device.

FIG. 8 is a perspective view of a multi-direction input device according to an embodiment of the present invention. FIG. 9 is an exploded perspective view of a stick controller included in the multi-direction input device. FIG. 10 is a perspective view of the stick controller. FIG. 11 is a perspective view of a power conversion mechanism included in the stick controller. FIG. 12 is a plan view illustrating the layout of parts of the multi-direction input device.

According to this embodiment, a multi-direction input device 30 is a force feedback multi-direction input device known as a haptic controller that provides an electrically controlled force feedback to an operation lever pivotally operated by an operator. The multi-direction input device 30 includes a synthetic resin housing 31 having a through-hole 31a on its top, a stick controller 32 accommodated in the housing 31, and a lid 33 for opening and closing a bottom opening of the housing 31.

The stick controller 32 includes a frame 34 formed from a material having a mechanical strength, such as an aluminum. The frame 34 rotatably supports a first driving lever 35 and a second driving lever 36 such that the rotation axes of the first driving lever 35 and the second driving lever 36 are perpendicular to each other. A support module 34a, which is a square in plan view and which supports the first driving lever 35 and the second driving lever 36, is formed on the frame 34 as an integral part. Both sides of the top end of the first driving lever 35 are rotatably supported by bearings on two opposing side walls of the support module 34a, respectively. Similarly, both sides of the top end of the second driving lever 36 are rotatably supported by bearings on two other opposing side walls of the support module 34a, respectively. An operation lever 37 is connected to the intersection between the first driving lever 35 and the second driving lever 36. The operation lever 37 passes through the through-hole 31a and externally protrudes from the housing 31. The first driving lever 35 and the second driving lever 36 function as the power conversion mechanism that converts a swing movement of the operation lever 37 to two orthogonal rotational movements. The center portion of the operation lever 37 is rotatably supported by a central upper portion of the second driving lever 36 using a pin 38. The operation lever 37 passes through a long slit 36a formed in the lower portion of the second driving lever 36 and passes through a long slit 35a formed in the lower portion of the first driving lever 35. Accordingly, when the operation lever 37 is operated to swing in any direction, the first driving lever 35 and the second driving lever 36 rotate in accordance with the swing direction.

A fan-shaped gear section 35b is formed on one side of the first driving lever 35 as an integral part. Gear teeth 35c are formed on the top end of the gear section 35b while each tooth radially extends from the rotation axis of the first driving lever 35. A sensing plate 39 is fixed to the other side of the first driving lever 35. A block section 39a formed at a lower end of the sensing plate 39 protrudes in the direction opposite to the gear section 35b. Similarly, a fan-shaped gear section 36b is formed on one side of the second driving lever 36 as an integral part. Gear teeth 36c are formed on the top end of the gear section 36b while each tooth radially extends from the rotation axis of the second driving lever 36. A sensing plate 40 is fixed to the other side of the second driving lever 36. A block section 40a formed at a lower end of the sensing plate 40 protrudes in the direction opposite to the gear section 36b.

Two motors having the identical structure to the motor 1 shown in FIGS. 1 to 6 are mounted on the frame 34. For the sake of clarity, one of the motors is referred to as a "first motor" designated by a reference numeral 41, and the other motor is referred to as a "second motor" designated by a reference numeral 42. As described above, the motors 41 and 42 include PTCs in the holder 3. The tapered cutout surface 3c is formed on the outer surface of the holder 3. As shown in FIG. 12, the first motor 41 and the second motor 42 are disposed such that lines P passing through the rotation axes of the first motor 41 and the second motor 42 are orthogonal to each other. The cutout surface 3c on the holder 3 of the first motor 41 is opposed to the cutout surface 3c on the holder 3 of the second motor 42 with an intersecting point Q of the two lines P therebetween. In this manner, since the first motor 41 and the second motor 42 are disposed close to each other in two mutually perpendicular directions such that the cutout surfaces 3c on the holders 3 of the motors 41 and 42 are opposed to each other with respect to an intersecting point Q, each of the motors 41 and 42 can utilize the cut out figure portions 3i of the holders 3 of the other motors 41 and 42 as a space for itself. Thus, the holders 3 of the first motor 41 and the second motor 42 can be disposed as close as possible. As a result, the size of the multi-direction input device 30 can be reduced in plan view.

The rotation shaft 6 of the first motor 41 protrudes in the direction opposite to the intersecting point Q. The rotation shaft 6 of the second motor 42 also protrudes in the direction opposite to the intersecting point Q. A gear 43 is coupled to the rotation shaft 6 of the first motor 41. The gear 43 is engaged with the gear teeth 35c of the gear section 35b formed on the first driving lever 35 inside the support module 34a. For the sake of clarity, the first motor 41 is not shown in FIG. 11. However, when viewed from the first motor 41 side, the gear 43 coupled to the rotation shaft 6 and the gear section 35b integrated in the first driving lever 35 form a reduction gear train. The rotation of the first motor 41 is reduced by the reduction gear train and is transferred to the first driving lever 35. Similarly, a gear 44 is coupled to the rotation shaft 6 of the second motor 42. The gear 44 is engaged with the gear teeth 36c of the gear section 36b formed on the second driving lever 36 inside the support module 34a. When viewed from the second motor 42 side, the gear 44 and the gear section 36b form a reduction gear train. The rotation of the second motor 42 is reduced by the reduction gear train and is transferred to the second driving lever 36.

A helical gear 45 of large diameter is coupled to the rotation shaft 6 of the first motor 41. The helical gear 45 of large diameter is integrated into the gear 43. The helical gear 45 of large diameter externally protrudes from a side wall of the support module 34a. The side wall of the support module 34a rotatably supports a helical gear 46 of small diameter and a first code plate 47. The helical gear 45 is engaged with the helical gear 46. An endless belt 50 is wound on a pulley 48 coupled to the outside of the helical gear 46 of small diameter and a pulley 49 coupled to the outside of the first code plate 47. These gear 43, helical gear 45 of large diameter, helical gear 46 of small diameter, pulley 48, belt 50, and pulley 49 form a multiplying gear train for the first driving lever 35. The rotation of the first driving lever 35 is speeded up by the multiplying gear train and is transferred to the first code plate 47. Similarly, a helical gear 51 of large diameter is coupled to the rotation shaft 6 of the second motor 42. The helical gear 51 of large diameter is integrated into the gear 44. The helical gear 51 of large diameter externally protrudes from another side wall of the support module 34a. The other side wall of the support module 34a rotatably supports a helical gear 52 of small diameter and a second code plate 53. The helical gear 51 is engaged with the helical gear 52. An endless belt 56 is wound on a pulley 54 coupled to the outside of the helical gear 52 of small diameter and a pulley 55 coupled to the outside of the second code plate 53. These gear 44, helical gear 51 of large diameter, helical gear 52 of small diameter, pulley 54, belt 56, and pulley 55 form a multiplying gear train for the second driving lever 36. The rotation of the second driving lever 36 is speeded up by the multiplying gear train and is transferred to the second code plate 53.

A circuit board 57 is mounted on the lower end of the frame 34. A first photo interrupter 58 and a second photo interrupter 59 are mounted on the circuit board 57. The first photo interrupter 58 and the first code plate 47 function as a first rotary encoder. The second photo interrupter 59 and the second code plate 53 function as a second rotary encoder. Each of the photo interrupters 58 and 59 includes a light emitting device and a light receiving device (none are shown). The light emitting device is opposed to the light receiving device with a recess 58a therebetween or with a recess 59a therebetween. The first code plate 47 and the second code plate 53 have a plurality of slits 47a and 53a in the peripheries thereof, respectively. The code plates 47 and 53 rotate in the recess 58a of the first photo interrupter 58 and in the recess 59a of the second photo interrupter 59, respectively. In addition to the first photo interrupter 58 and the second photo interrupter 59, two photo interrupters 60 and 61 are mounted on the circuit board 57. The block section 39a of the sensing plate 39 coupled to the first driving lever 35 rotates in a recess 60a of the photo interrupter 60. The block section 40a of the sensing plate 40 coupled to the second driving lever 36 rotates in a recess 61a of the photo interrupter 61. Accordingly, when the block section 39a of the sensing plate 39 and the block section 40a of the sensing plate 40 are located in the recesses 60a and 61a, light from the light emitting devices are blocked by the block sections 39a and 40a, respectively. Therefore, OFF signals are output from the photo interrupters 60 and 61. When the block sections 39a and 40a are located distant from the recesses 60a and 61a, light from the light emitting devices are received by the light receiving devices, respectively. Therefore, ON signals are output from the photo interrupters 60 and 61.

A sensing signal output from each of the photo interrupters 58, 59, 60, and 61 is received by a control unit 62. The control unit 62 calculates the absolute positions of the first driving lever 35 and the second driving lever 36 based on the sensing signals from the photo interrupters 60 and 61. Based on the absolute positions, the control unit 62 also calculates the rotational directions and rotational amounts of the first driving lever 35 and the second driving lever 36 using the sensing signals from the first photo interrupter 58 and the second photo interrupter 59. That is, the control unit 62 calculates the swing direction and swing amount (swing angle) of the operation lever 37. Furthermore, the control unit 62 determines a control signal based on data and a program stored in a memory and outputs the control signal to the first motor 41 and the second motor 42. This control signal determines an operational sensation provided to the operation lever 37. For example, the signal causes a vibration and a change in force (a resistance force and a thrust force). Additionally, circuit components of the control unit 62 are mounted on a back side of the circuit board 57 and on another circuit board (not shown).

The operation of the force feedback multi-direction input device 30 having such a structure is described next.

When a system of the multi-direction input device 30 is powered on, the control unit 62 retrieves detection signals from the photo interrupters 60 and 61 and outputs control signals to the first motor 41 and the second motor 42. The first motor 41 and the second motor 42 rotate the first driving lever 35 and the second driving lever 36 to automatically return the operation lever 37 to a neutral position. In this case, the first motor 41 and the second motor 42 drive the first driving lever 35 and the second driving lever 36 so that outputs of the photo interrupters 60 and 61 change from off to on. When the outputs of the photo interrupters 60 and 61 change from off to on, the operation lever 37 is located at the neutral position. The control unit 62 records this position as a reference position (absolute position).

When an operator operates the operation lever 37 protruding from the through-hole 31a of the housing 31 to swing in any direction after the operation lever 37 automatically returns to the neutral position, the first driving lever 35 and the second driving lever 36 rotate about the rotation axes thereof in accordance with the swing direction. For example, when the operation lever 37 is operated to swing in the Y-Y direction in FIG. 12, only the first driving lever 35 rotates in that direction. When the operation lever 37 is operated to swing in the X-Y direction (the direction between the X direction and the Y directions), both the first driving lever 35 and the second driving lever 36 rotate. The rotation of the first driving lever 35 is transferred to the first code plate 47 while the rotation speed is increased by the gear teeth 35c of the gear section 35b, the gear 43, the helical gear 45 of large diameter, the helical gear 46 of small diameter, the pulley 48, the belt 50, and the pulley 49. The rotation of the second driving lever 36 is transferred to the second code plate 53 while the rotation speed is increased by the gear teeth 36c of the gear section 36b, the gear 44, the helical gear 51 of large diameter, the helical gear 52 of small diameter, the pulley 54, the belt 56, and the pulley 55. Consequently, on/off sensing signals are continuously input to the control unit 62 from the first photo interrupter 58 and the second photo interrupter 59 of the first and second rotary encoders.

The control unit 62 computes the rotational directions and rotation amounts of the first driving lever 35 and the second driving lever 36 based on the relative position obtained from the sensing signals from the first photo interrupter 58 and the second photo interrupter 59 and the absolute position obtained from the sensing signals from the photo interrupters 60 and 61. The control unit 62 then outputs predetermined control signals to the first motor 41 and the second motor 42. For example, when the operation lever 37 is operated to swing in a predetermined direction by a predetermined amount of movement, the rotations of the first motor 41 and the second motor 42 are transferred to the first driving lever 35 and the second driving lever 36 while the rotation speeds of the first motor 41 and the second motor 42 are reduced by the gears 43 and 44 and the gear sections 35b and 36b. Thus, a resistance force is provided to the operation lever 37 in the swing direction via the first driving lever 35 and the second driving lever 36. The operator who manually operates the operation lever 37 recognizes the force as a click sensation.

As described above, in the force feedback multi-direction input device 30, the holder 3 having a built-in PTC is attached to the first motor 41 and the second motor 42, which are driving sources for providing a force feedback to the operation lever 37. The tapered cutout surface 3c is formed on the outer surface of the holder 3. When the first motor 41 and the second motor 42 are disposed such that lines P passing through the rotation axes of the first motor 41 and the second motor 42 are orthogonal to each other, the cutout surface 3c on the holder 3 of the first motor 41 is opposed to the cutout surface 3c on the holder 3 of the second motor 42 with an intersecting point Q of the two lines P therebetween. In this manner, each of the motors 41 and 42 can utilize the cut out figure portions 3i of the holders 3 of the other motors 41 and 42 as a space for itself. Thus, the holders 3 of the first motor 41 and the second motor 42 can be disposed as close as possible. As a result, the size of the multi-direction input device 30 can be reduced in plan, view.

What is claimed is:

1. A motor comprising:
a cylindrical casing having an opening at one end, a permanent magnet being fixed to an the inner peripheral surface of the casing;
a holder for covering the opening of the casing;
a rotation shaft rotatably supported by the casing and the holder;
an armature and a commutator coupled to the rotation shaft;
a brush in sliding contact with the commutator;
an input terminal connected to the brush; and
a plate-shaped positive temperature coefficient thermistor for controlling an electrical current flowing in a winding of the armature;
wherein the holder accommodates the input terminal and the positive temperature coefficient thermistor and the positive temperature coefficient thermistor is accommodated in a container section formed in the holder in the vicinity of a periphery of an inner wall of the holder opposed to an inside of the casing and wherein a cut out figure portion is formed on an outer wall of the holder, the cut out figure portion obliquely extends so that a container section side of the holder has a maximum length of the holder, and an axis line on the rotation shaft passes through the cut out figure portion.

2. The motor according to claim 1, wherein the positive temperature coefficient thermistor is accommodated in the container section such that a plane of the positive temperature coefficient thermistor is parallel to the rotation shaft.

3. The motor according to claim 1, wherein the cut out figure portion is a tapered surface inclined at substantially 45 degrees with respect to the rotation shaft.

4. A motor with encoder comprising:
the motor according to claim 1;
a code plate; and
a sensing device for sensing the rotation of the code plate;
wherein the code plate is coupled to an end of the rotation shaft protruding from the holder and at least part of the sensing device is disposed in the cut out figure portion.

5. A multi-direction input device comprising:
an operation lever pivotally operable;
two driving levers rotatable in accordance with a pivotal operation of the operation lever, rotation shafts of the two driving levers being orthogonal to each other;
a mounting base for rotatably supporting the driving levers; and
two actuators for driving the driving levers;
wherein the two actuators are the motors according to claim 1, the two motors are orthogonally arranged so that the holders are disposed close to each other, and the cut out figure portions formed on the holders are opposed to each other at an intersecting point of the two motors.

6. The multi-direction input device according to claim 5, wherein a gear is coupled to the rotation shaft of each of the motors, the rotation shaft protrudes from a side opposite to the holder, and the gears are engaged with gear sections mounted on the driving levers, respectively.

7. The multi-direction input device according to claim 6, further comprising:
two rotary encoders, each sensing rotation of each driving lever via a gear train; and
a control unit for controlling driving of the two motors based on signals output from the rotary encoders;
wherein the mounting base comprises a supporting module comprising substantially orthogonally connected side walls, and each wall of the supporting module supports the gear train and a code plate of the rotary encoder.

* * * * *

UNITED STATES PATENT AND TRADEMARK OFFICE
CERTIFICATE OF CORRECTION

PATENT NO. : 7,345,389 B2  Page 1 of 1
APPLICATION NO. : 11/133087
DATED : March 18, 2008
INVENTOR(S) : Shigeru Furuki It is certified that error appears in the above-identified patent and that said Letters Patent is hereby corrected as shown below:

In the Claims

Column 11, in claim 1, line 3, after "being fixed to an" delete "the".

Signed and Sealed this

Nineteenth Day of August, 2008

JON W. DUDAS
*Director of the United States Patent and Trademark Office*